INVENTOR
REED A. PALMER

INVENTOR
REED A. PALMER

April 2, 1968 R. A. PALMER 3,375,686
CONTROL SYSTEM FOR AN APPARATUS OR THE LIKE
Filed Oct. 26, 1966 3 Sheets-Sheet 3

INVENTOR
REED A. PALMER

BY

HIS ATTORNEYS

United States Patent Office 3,375,686
Patented Apr. 2, 1968

3,375,686
CONTROL SYSTEM FOR AN APPARATUS
OR THE LIKE
Reed A. Palmer, Greensburg, Pa., assignor to Robertshaw Controls Company, Richmond, Va., a corporation of Delaware
Filed Oct. 26, 1966, Ser. No. 589,669
15 Claims. (Cl. 68—12)

ABSTRACT OF THE DISCLOSURE

This disclosure relates to a means for providing a source of actuating fluid to be sequentially interconnected to a plurality of fluidically operated actuators to control the cycle of operation of a washing apparatus or the like, the means that creates the source of actuating fluid comprising a water fill conduit having an aspirator therein which will evacuate an accumulator to provide the source of actuating fluid.

---

This invention relates to an improved control system for an apparatus having fluidically operated actuator means.

It is well known from the disclosure of the U.S. patent to Scott et al., No. 3,177,898, that a control system can be provided for a washing apparatus or the like, such as a domestic laundry washing machine or dishwasher, wherein the cycle of operation of the apparatus is automatically controlled by a program means that interconnects a source of actuating fluid to various fluidically operated actuator means in a predetermined sequence to automatically control such apparatus throughout its entire cycle of operation as selected by the housewife when setting the program means at a desired starting position thereof and, thereafter, actuating a starting mechanism.

However, when such fluidically operated control system as set forth in the aforementioned patent is utilized, the source of actuating fluid is created by a vacuum pump that is electromagnetically driven for continuous operation thereof when an on-off member of the control system is moved to its on position whereby the program means will thereafter automatically control the cycle of operation of the apparatus throughout a particular cycle previously selected by the housewife or the like.

It is a feature of this invention to provide an improvement in such previously described control system wherein such electromagnetically operated fluid pump means can be eliminated and the apparatus itself can provide the source of actuating fluid so that such actuating fluid can be utilized to control the entire cycle of operation thereof in the above manner.

In this manner, not only are fewer moving parts required by the control system of this invention, but also less electrical wire harness means and electrical switches are required as will be apparent hereinafter.

In one embodiment of this invention, the operator, in manually turning on the apparatus, will create a flow of a first fluid which, in turn, will create a source of actuating fluid that can be utilized for operating the fluidically operated actuator means of the apparatus for controlling the desired cycle of operation thereof.

For example, in a washing apparatus, such as a dishwasher or the laundry washing machine, the flow of wash water being initially directed therein at the start of the cycle of operation thereof can be utilized as the fluid for creating the source of actuating fluid in a manner hereinafter described.

Accordingly, it is an object of this invention to provide an improved control system for an apparatus having fluidically operated actuator means or the like, the system of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a schematic cross-sectional view illustrating the improved control system of this invention for a conventional laundry washing apparatus or the like.

Figure 1:
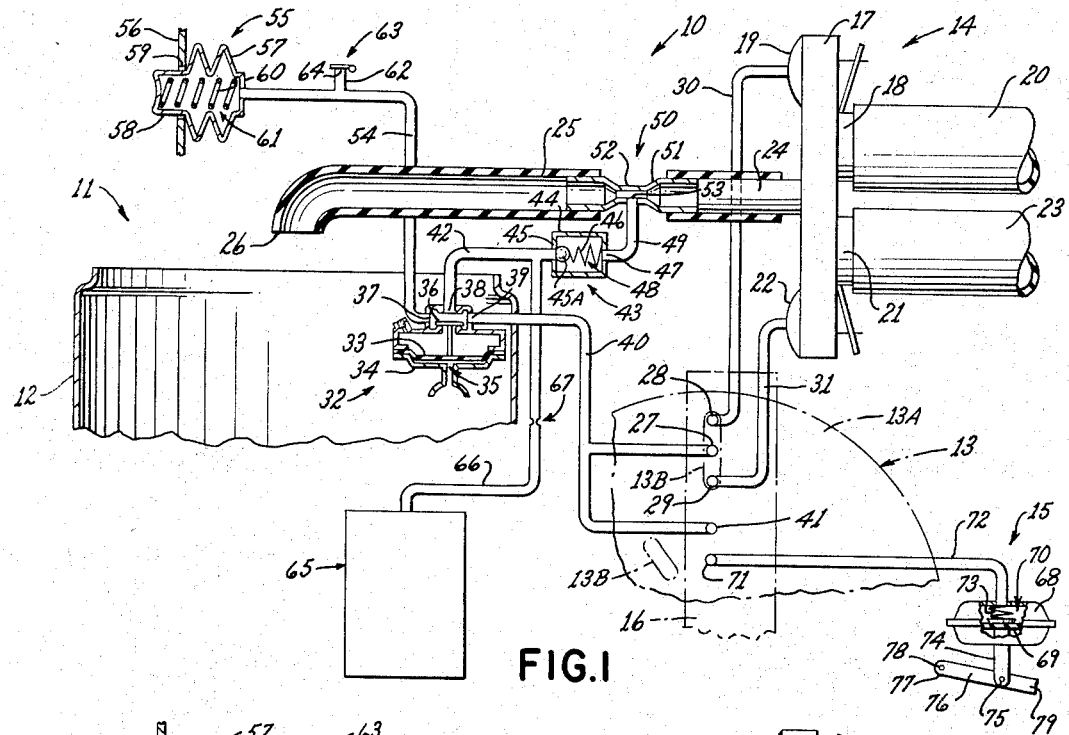

While the various features of this invention are hereinafter described and illustrated as being particularly adaptable for providing a control means for a laundry washing machine or the like, it is to be understood that the various features of this invention can be utilized singly or in any combination thereof to provide a control means for other types of apparatus as desired.

Therefore, this invention is not to be limited to only the embodiment illustrated in the drawings, because the drawings are merely utilized to illustrate one of the wide variety of uses of this invention.

Referring now to FIGURE 1, the improved control system of this invention is generally indicated by the reference numeral 10 and is utilized for controlling the operation of a domestic laundry washing machine generally indicated by the reference numeral 11 and having a conventional laundry confining means or tub 12.

The control system 10 includes a program means 13 substantially of the type disclosed in the U.S. patent to Mansell, No. 3,123,976, for sequentially and automatically interconecting a source of actuating fluid to various fluidically operated actuators 14 and 15 and the like for operating various parts or devices of the apparatus 11 during the cycle of operation thereof.

In particular, the program means 13 includes a substantially flexible reading sheet 13A having a plurality of blisters or channel means 13B provided therein in a predetermined pattern with each blister means 13B being adapted to bridge and, thus, fluidly interconnect together two or more ports interrupting a reading surface of a stationary reading head 16 for a purpose hereinafter described and fully disclosed in the aforementioned U.S. Patent No. 3,177,898, and U.S. Patent No. 3,123,976. In this manner, the blister means 13B can be so constructed and arranged that as the program member 13A is rotated or otherwise moved relative to the reading head 16 by a timer motor or the like, the blister means 13B will sequentially interconnect a source of actuating fluid to and disconnect the same from the various fluidically operated actuator means of the apparatus 11 to automatically and sequentially control the same throughout an entire operating cycle thereof.

In the embodiment of the control system 10 illustrated in the drawings, the actuator 14 comprises a water mixing valve substantially of the type disclosed in the U.S. patent to Palmer, No. 3,250,295, wherein a suitable housing 17 has an internal chamber thereof adapted to be interconnected to a hot water inlet 18 when a chamber of a fluidically operated actuator 19 is evacuated, the inlet 18 being interconnected to a source of hot water by a conduit means 20 in a manner well known in the art. Similarly, the chamber of the housing 17 is adapted to be fluidly interconnected to a cold water inlet 21 when the chamber of a fluidically operated actuator 22 is evacuated, the inlet 21 being interconnected to a source of cold water by a conduit means 23. The chamber of the housing 17 has a single outlet 24 fluidly interconnected to a conduit or passage defining means 25 having an outlet end 26 for directing the water from the water mixing valve 14 into the tub 12 of the apparatus 11 in a manner well known in the art.

In this manner, the water mixing valve 14 can be controlled by the program member 13A to direct hot water, mixed hot and cold water or cold water to the tube 12 of the apparatus 11 depending upon whether the blister means 13B of the program member 13A interconnect an actuating fluid source port means 27 of the reading head 16 to one of or both port means 28 and 29 interrupting the reading surface of the reading head 16, the port means 28 being disposed in fluid communication with the chamber of the actuator 19 by suitable conduit means 30 and the port means 29 being in fluid communication with the chamber of the actuator 22 by suitable conduit means 31.

Figure 4:
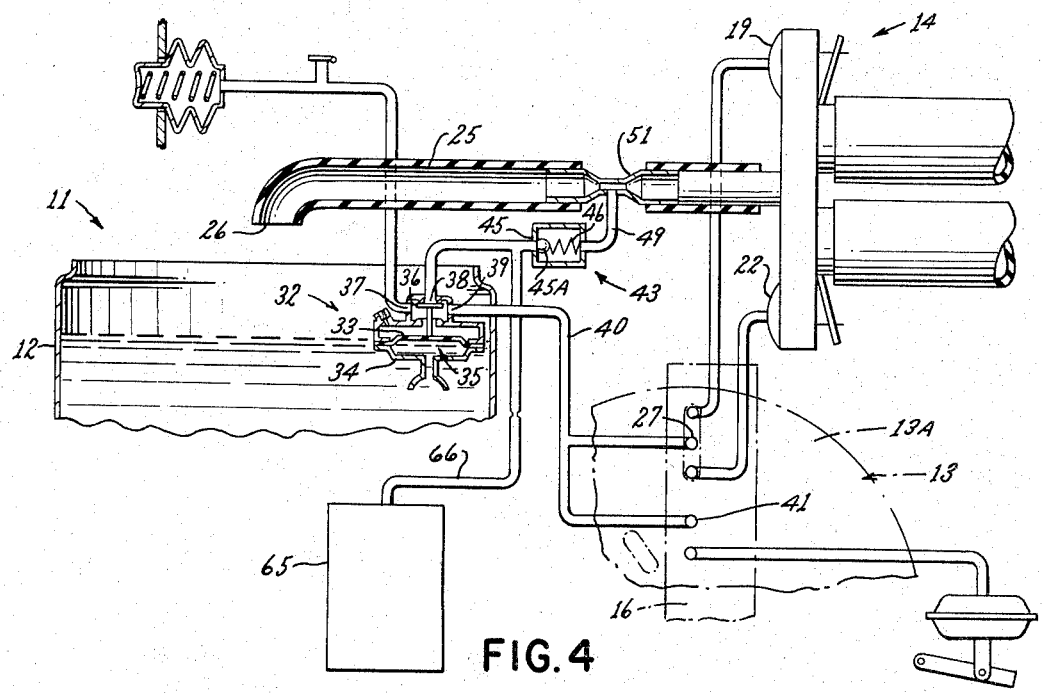
FIGURE 4 is a view similar to FIGURE 1 and illustrates the control system in another operating position thereof.

A water level sensing means 32 is provided for the apparatus 11 and can be of the type set forth in the U.S. patent to Beck, No. 3,189,317, wherein a flexible diaphragm 33 cooperates with a housing means 34 to define a chamber 35 which has the air therein progressively compressed as the level of water in the tube 12 rises so that when a predetermined level of water is created in the tub 12, the flexible diaphragm 33 is moved from the position illustrated in FIGURE 4 to terminate the operation of the water mixing valve 14 in a manner hereinafter described.

The flexible diaphragm 33 of the water level sensing means 32 carries a valve member 36 which permits fluid communication between three port means 37, 38 and 39 of the housing means 34 when the diaphragm is disposed in the position illustrated in FIGURE 1 and which seals off the port means 38 from the port means 36 and 39 when the diaphragm 33 is moved to the position illustrated in FIGURE 4 for a purpose hereinafter described.

The port means 39 of the water level sensing means 32 is interconnected by suitable conduit means 40 to the previously described port means 27 of the reading head 16 as well as to other port means thereof, such as port means 41 illustrated in FIGURE 1 for a purpose hereinafter described.

The port 38 of the water level sensing means 32 is interconnected by a suitable conduit means 42 to a one way check valve means 43, the check valve means 43 including a housing 44 having a valve seat 45 in fluid communication with the conduit means 42 and normally closed by a ball valve member 45A urged to the closed position by compression spring means 46.

Figure 3:
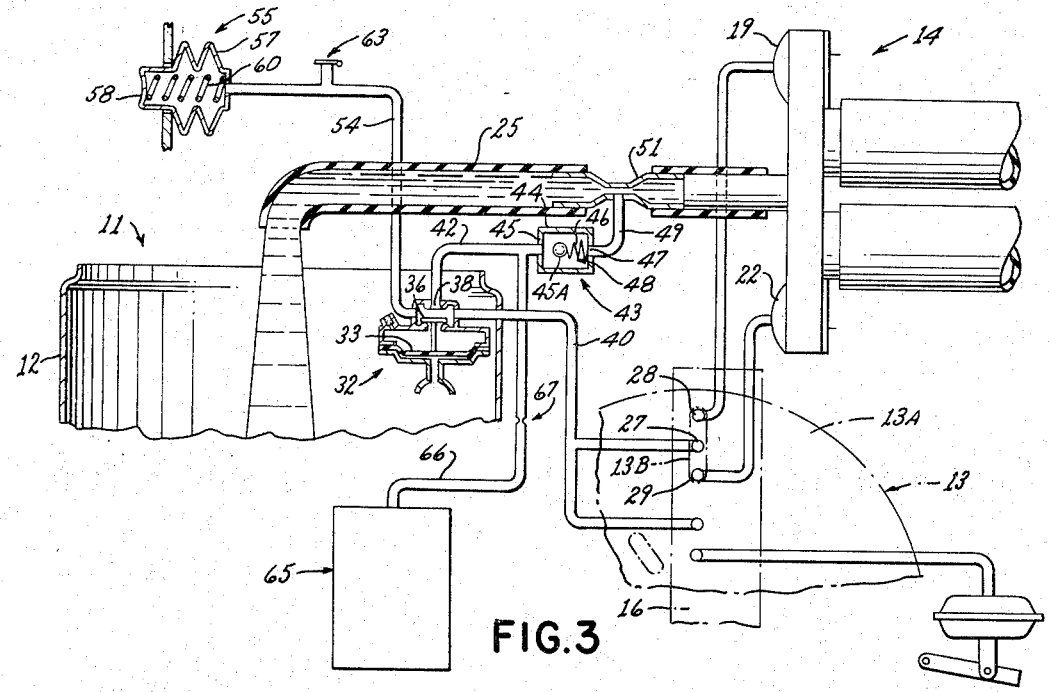
FIGURE 3 is a view similar to FIGURE 1 and illustrates the control system creating its own source of actuating fluid.

The housing 44 of the check valve means 43 is provided with a port means 47 interconnecting a chamber 48 of the housing means 44 with a conduit means 49 whereby the conduit means 49 is disconnected from fluid communication with the previously described conduit means 42 when the ball valve member 45A is sealed against the valve seat 45 by the compression spring 46. Conversely, the conduit means 42 and 49 are placed in fluid communication when the ball valve member 45A is moved away from the valve seat 45 in a manner hereinafter described and as illustrated in FIGURE 3.

An actuating fluid creating means 50 is carried by the passage defining means 25 and in the embodiment illustrated in the drawings comprises an aspirator defined by a venturi member 51 disposed in the passage means 25 and having the throat portion 52 thereof in fluid communication with the end 53 of the conduit means 49 whereby when the water mixing valve 14 directs water through the passage defining means 25 to the tube 12, the flow of water through the throat portion 52 of the venturi member 51 draws a suction in the conduit means 49 to be utilized in a manner hereinafter described as the actuating fluid for the control system 10.

The port means 37 of the water level sensing means 32 is interconnected by a suitable conduit means 54 to a manually operated collapsible chamber defining means 55 mounted adjacent the control panel 56 of the apparatus 11.

In particular, the collapsible chamber defining means 55 comprises a bellows-like member 57 having a button portion 58 projecting through an opening 59 in the control panel 56 and normally urged to its uncollapsed position illustrated in FIGURE 1 by a compression spring 60 disposed within the chamber 61 of the bellows member 57, the chamber 61 being in fluid communication with the conduit means 54. The conduit means 54 has a branch conduit means 62 provided with a one-way check valve means 63 which normally closes off the end 64 of the branch conduit means 62 from the atmosphere for a purpose hereinafter described.

An actuating fluid storage means or accumulator 65 is provided and has the internal chamber thereof fluidly interconnected with the conduit means 42 by a conduit means 66 intermediate the port 38 of the water level sensing means 32 and the valve seat 45 of the one-way check valve means 43 for a purpose hereinafter described, the conduit means 66 having a restriction or orifice means 67 provided therein intermediate the storage means 65 and the conduit means 42 for a purpose hereinafter described.

While the system 10 of this invention can be utilized in a manner hereinafter described to operate various types of fluidically operated actuator means, the typical type of actuator means that is generally indicated by the reference numeral 15 in FIGURE 1 comprises a rigid and fixed housing member 68 carrying a flexible diaphragm 69 to define a chamber 70 therebetween. The chamber 70 is fluidly interconnected to a reading head port means 71 by suitable means 72.

The flexible diaphragm 69 of the actuator 15 is normally urged to the position illustrated in FIGURE 1 by a compression spring 73 disposed in the chamber 70 and carries an actuating post means 74 pivotally mounted by a pivot pin 75 to a lever 76 pivoted at one end 77 thereof to a stationary frame means by a pivot pin 78 whereby the other end 79 of the lever 76 can control any desired structure, such as an electrical switch, speed control means for a transmission means for spinning the washing compartment means 12 during a centrifuging operation or the like or for moving an agitator in the washing compartment means 12.

In any event, it can be seen that various types of fluidic operated actuator means 14 and 15 and the like can have the actuating chambers thereof fluidly interconnected to various port means formed in the reading head 16 to be controlled by the program member 13A in a manner now to be described.

Figure 2:
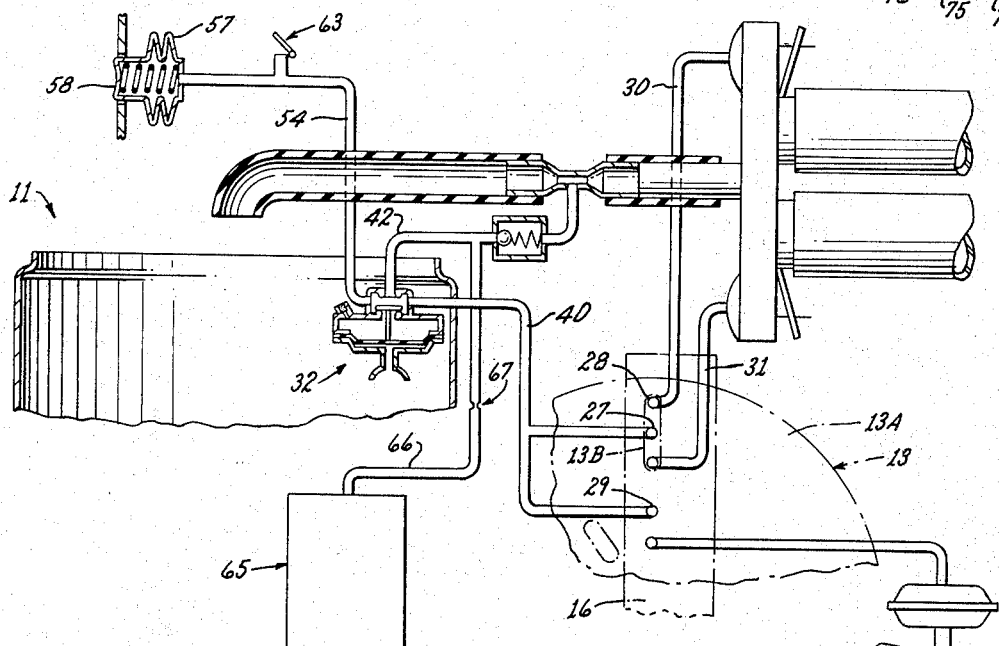
FIGURE 2 is a view similar to FIGURE 1 and illustrates the control system in its initially on position.

The housewife or the like usually sets the program member 13A of the program means 13 in the desired position thereof for an automatic cycle of operation of the washing machine 11 in the manner illustrated in FIGURE 1 wherein a particular blister means 13B is bridging the ports 27, 28 and 29 in the reading head 16. In order to initiate the operation of the selected cycle of operation of the washing machine 11, the housewife or the like pushes inwardly on the start button portion 58 of the bellows construction 57 in the manner illustrated in FIGURE 2 whereby the bellows construction 57 is collapsed and the air subsequently compressed in the conduit means 54, 42, 40, 30 and 31 is expelled to the atmosphere through the one way check valve means 63, the orifice or restriction means 67 in the conduit means 66 preventing the compressed air from flowing into the storage means 65.

When the housewife or the like releases the pushed in button portion 58 of the bellows 55, the compression spring 60 tends to expand the collapsed bellows construction 57 whereby a vacuum is drawn in the conduit means 54, 42 and 40 by the expanding bellows construction 55, the orifice or restriction means 67 in the conduit means 66 leading to the accumulator 65 preventing such initial vacuum in the conduit means 54, 42 and 40 from being immediately drawn on the accumulator 65 and the ball valve member 45A and the check valve means 63 preventing the atmosphere from entering the now evacuated conduit means 54, 42 and 40.

Because a particular blister means 13B of the reading sheet 13A is bridging the ports 27, 28 and 29 in the manner illustrated in FIGURE 3 during the expanding of the previously collapsed bellows construction 57, the vacuum being created in the conduit means 40 by the expanding bellows construction 57 imposes a vacuum in the chambers of the actuators 19 and 22 of the mixing valve means 14 whereby water is adapted to flow through the passage means 25 from the now opened water mixing valve means 14 to the chamber defining means 12 in the manner illustrated in FIGURE 3.

As this initial flow of water passes through the venturi member 51, suction is created in the conduit 49 causing the one-way check valve 45 to open as illustrated in FIGURE 3 whereby this vacuum source creating means 51 is interconnected to the port means 27 of the reading head 16 as long as the water level sensing means 32 has the valve member 36 thereof disposed away from the port 38.

During the period of time that the water mixing valve 14 is directing water through the passage means 25 into the confining means 12 of the washing apparatus 11, the aspirator of venturi member 51 is continuously drawing a vacuum in the line 42 and, thus, is maintaining the chambers of the actuators 19 and 22 in their evacuated condition as well as continuously evacuating the accumulator or storage means 65 through the orifice means 67 of the passage means 66. Thus, even though the collapsible bellows 57 has returned to its outward position illustrated in FIGURE 3 so as to not further draw a vacuum on the conduit means 54, etc., it can be seen that the vacuum being drawn on the conduit 49 by the venturi means 51 maintains the water mixing valve 14 in its open position because the blister means 13B of the reading sheet 13A is still bridging the ports 27, 28 and 29.

However, when the water level in the confining means 12 of the apparatus 11 reaches a predetermined level, the same will cause the flexible diaphragm 33 to snap upwardly in the manner illustrated in FIGURE 4 and cause the valve member 36 to close off the port 38 from the port 39 whereby the source of vacuum or actuating fluid is disconnected from the chambers of the actuators 19 and 22 of the water mixing valve 14 to terminate the flow of water to the confining means 12 of the apparatus 11 when the chambers of the actuators 19 and 22 return to their normal atmospheric conditions, such as by air returning to the chambers of the actuators 19 and 22 through fixed orifice means in a controlled bleed type of operation. At this time, since the venturi 51 no longer has water flowing therethrough, no additional vacuum condition is created in the conduit 49 so that the same returns to atmospheric condition by air returning thereto through the inlet end 26 of the passage means 25 and permits the ball valve member 45A to seat against the valve seat 45 under the force of the compression spring 46 whereby the atmosphere cannot return to the now evacuated storage means or accumulator 65 through the check valve means 43.

It is well known that when the water level sensing means 32 is actuated in the manner illustrated in FIGURE 4, the water level sensing means 32 can energize a timer motor to move the program member 13A of the program means 13 to sequentially and automatically control the remaining operation of the apparatus 11 during the selected cycle thereof.

Figure 5:
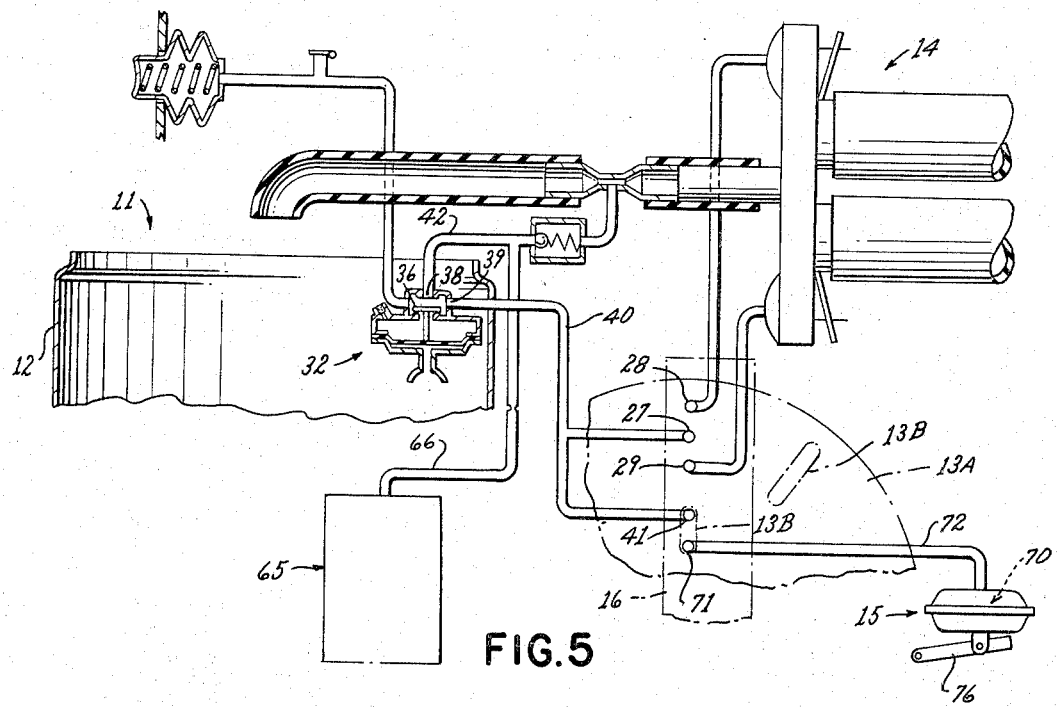
FIGURE 5 is a view similar to FIGURE 1 and illustrates the control system operating various actuator means of the apparatus.

For example, as illustrated in FIGURE 5, the blister means 13B on the program sheet 13A are so constructed and arranged that when the water level in the confining means 12 drops below the predetermined level to permit the sensing means 32 to move back to the position illustrated in FIGURE 1 and have the valve member 36 thereof moved away from the port 38, no blister means 13B will be bridging the port 27 with the ports 28 and 29 leading to the mixing valve 14 until rinse water or other wash water is to be directed to the confining means 12.

However, the blister means 13B on the program sheet 13A can be utilized to interconnect the vacuum source port means 41 to other port means, such as port means 71, to actuate other actuators, such as actuator 15, to control other operations of the apparatus 11.

For example, as illustrated in FIGURE 5, a blister means 13B is bridging the ports 41 and 71 in the reading head 16 whereby the source of vacuum provided by the storage means 65 is now interconnected by means of the passage means 66 and 42, ports 38 and 39 and conduit means 40 to the vacuum source port 41 of the reading head 16 and, by the bridging blister means 13B, to the port means 71, conduit means 72 and the chamber 70 of the actuator 15.

When the vacuum source means 65 is interconnecting the chamber 70 of the actuator 15, the diaphragm 69 of the actuator 15 is moved upwardly by the pressure differential across the diaphragm 69 to move the lever means 76 from the position illustrated in FIGURE 1 to the position illustrated in FIGURE 5 for causing a predetermined operation of the apparatus 11.

Thus, it can be seen that the storage means 65 will now provide sufficient actuating fluid for controlling the other fluidically operated actuator means of the apparatus 11 during the remaining portions of the selected cycle of operation of the apparatus 11.

For example, it has been found that when the water mixing valve means 14 causes a flow of approximately two gallons of water per minute through the venturi member 51, a 200 cu. inch accumulator 65 could be pumped out in two minutes while flowing six gallons of water into the confining means 12 of the apparatus 11. Such accumulator 65 will then sustain a 30 cu. inch per minute flow for twenty-five minutes of 4 inches Hg whereby such storage means 65 will have more than ample capacity to accomplish all functions of the apparatus 11 during a particular selected cycle of operation thereof.

Therefore, it can be seen that this invention provides means wherein a flow of fluid in an apparatus or the like is utilized to create a source of actuating fluid to be utilized for operating fluidically operated actuator means of the apparatus without requiring a separate means for creating such actuating fluid, such as an electromagnetically driven fluid pump means or the like as set forth in aforementioned U.S. patents to Scott et al. and Mansell.

While the form of the invention now preferred has been disclosed as required by the statutes, other forms may be used, all coming within the scope of the claims which follow.

What is claimed is:

1. In a control system for an apparatus having a plurality of fluidically operated actuator means, means for causing a flow of a first fluid from a source thereof, means defining passage means for said flow of said first fluid, said passage means having means for creating a source of actuating fluid when said first fluid flows through said passage means, and program means for interconnecting said source of actuating fluid to said actuator means in a predetermined sequence to operate the same and thereby provide cyclic operation of said apparatus.

2. In a control system for an apparatus having fluidically operated actuator means, means for causing a flow of a first fluid from a source thereof, means defining passage means for said flow of said first fluid, said passage means having means for creating a source of actuating fluid when said first fluid flows through said passage means, and means for interconnecting said source of actuating fluid to said actuator means to operate the same, said means for causing said flow of said first fluid comprising one of said actuator means.

3. In a control system as set forth in claim 2, said one actuator means comprises a fluidically operated water valve means and said source of said first fluid comprises a source of water under pressure.

4. In a control system as set forth in claim 3, said passage means comprises means for supplying water to said apparatus for use in washing cycle of operation of said apparatus.

5. In a control system as set forth in claim 4, said water valve means comprises a water mixing valve means.

6. In a control system as set forth in claim 3, manually operated means for initially supplying fluid to said fluidically operated water valve means to actuate the same and cause an initial flow of water through said passage means to create said source of actuating fluid, said means for interconnecting said source of actuating fluid to said actuator means including a program means, said program means interconnecting said source of actuating fluid to said fluidically operated water valve means to maintain said actuation thereof.

7. In a control system as set forth in claim 6, said manually operated means comprising a collapsible chamber means that will draw a vacuum of said one actuator means when said chamber means is manually collapsed and then released.

8. In a control system as set forth in claim 6, storage means for said actuating fluid, and means for interconnecting said means for creating said source of actuating fluid to said storage means whereby part of said actuating fluid will be stored in said storage means as the actuating fluid is being created by said first fluid flow.

9. In a control system as set forth in claim 8, said program means having means for interconnecting said storage means to other of said actuator means during pre-determined portions of the cycle of operation of said apparatus to sequentially actuate said actuator means.

10. In a control system as set forth in claim 9, said means for creating said source of actuating fluid comprises an aspirator disposed in said passage means whereby said aspirator draws a vacuum to operate said actuator means, said storage means comprising an accumulator means for being evacuated by said aspirator so that said evacuated accumulator can subsequentially draw a vacuum on a program means connected actuator means.

11. In a control system as set forth in claim 2, manually operated means for initially supplying fluid to said one actuator means to actuate the same and cause an initial flow of said first fluid through said passage means so that said initial flow of said first fluid will create said source of actuating fluid that will maintain the actuation of said one actuator.

12. In a control system as set forth in claim 11, said means interconnecting said source of actuating fluid to said actuator means includes selector means.

13. In a control system as set forth in claim 12, storage means, and means for interconnecting said means for creating said actuating fluid to said storage means to store part of said actuating fluid therein.

14. In a control system as set forth in claim 13, said selector means being adapted to interconnect said storage means to other actuator means to fluidically operate the same.

15. In a control system for an apparatus having fluidically operated actuator means, means for causing a flow of a first fluid from a source thereof, means defining passage means for said flow of said first fluid, said passage means having means for creating a source of actuating fluid when said first fluid flows through said passage means, means for interconecting said source of actuating fluid to said actuator means to operate the same, said apparatus comprising a laundry washing machine having confining means for confining and washing said laundry therein, said means for causing said first fluid flow comprising a vacuum operated water mixing valve, said passage means comprising means for directing water flow from said mixing valve to said confining means to provide a body of water therein, said means for creating said source of actuating fluid comprising an aspirator disposed in said passage means for drawing a vacuum when said water flows therethrough, a manually operated vacuum creating means for initially imposing a vacuum on said water mixing valve to open the same and cause an initial flow of water through said aspirator to draw a vacuum on said water mixing valve and maintain the same in its open position, accumulator means, means interconnecting said accumulator means to said aspirator to have a vacuum drawn therein for vacuum storage purposes, program means for interconnecting said accumulator means to others of said actuator means to actuate the same in a pattern determined by said program means, and a water level sensing means for sensing the level of said body of water in said confining means, said sensing means disconnecting said vacuum from said water mixing valve when said level of water reaches a predetermined level in said confining means to close said water mixing valve.

References Cited

UNITED STATES PATENTS 2,780,066    2/1957    Tarry   ---------------- 60—60
3,112,630    12/1963    Anderson et al. __ 137—624.18 X WILLIAM I. PRICE, *Primary Examiner.*